United States Patent [19]

Molnar et al.

[11] 4,033,593
[45] July 5, 1977

[54] SEAL FOR LARGE ANNULAR OPENINGS

[75] Inventors: Albert J. Molnar, Trafford; George E. Rudd, Murrysville; Joseph F. Meier, Export, all of Pa.

[73] Assignee: Westinghouse Electric Corporation, Pittsburgh, Pa.

[22] Filed: June 28, 1976

[21] Appl. No.: 700,234

[52] U.S. Cl. .............................. 277/212 F; 277/214
[51] Int. Cl.² ......................................... F16J 15/32
[58] Field of Search ............... 277/212, 212 F, 214, 277/215

[56] References Cited

UNITED STATES PATENTS

| 967,679 | 8/1910 | Shepheard | 277/212 F |
| 1,610,187 | 9/1926 | Myers et al. | 277/212 F |
| 2,149,147 | 2/1939 | Peterson et al. | 277/212 F |
| 2,625,414 | 1/1953 | Kranz | 277/212 F |

Primary Examiner—Robert I. Smith
Attorney, Agent, or Firm—F. J. Baehr, Jr.

[57] ABSTRACT

An elastomeric seal for sealing a large annular space having a groove on the low pressure side so that the seal will deflect easily when inserting a cylinder from the low pressure side and will withstand high differential pressure without blowing through.

7 Claims, 6 Drawing Figures

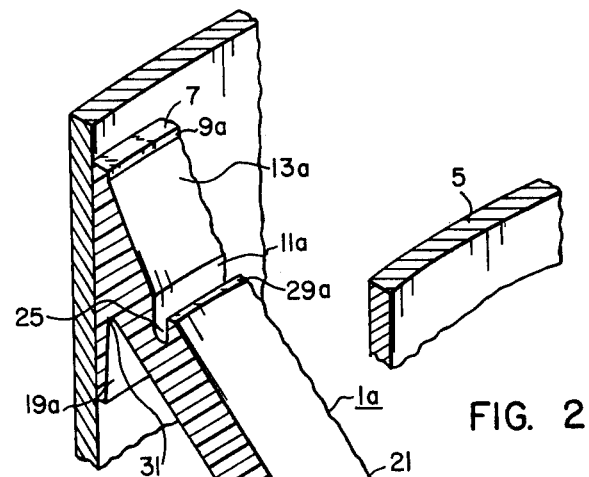
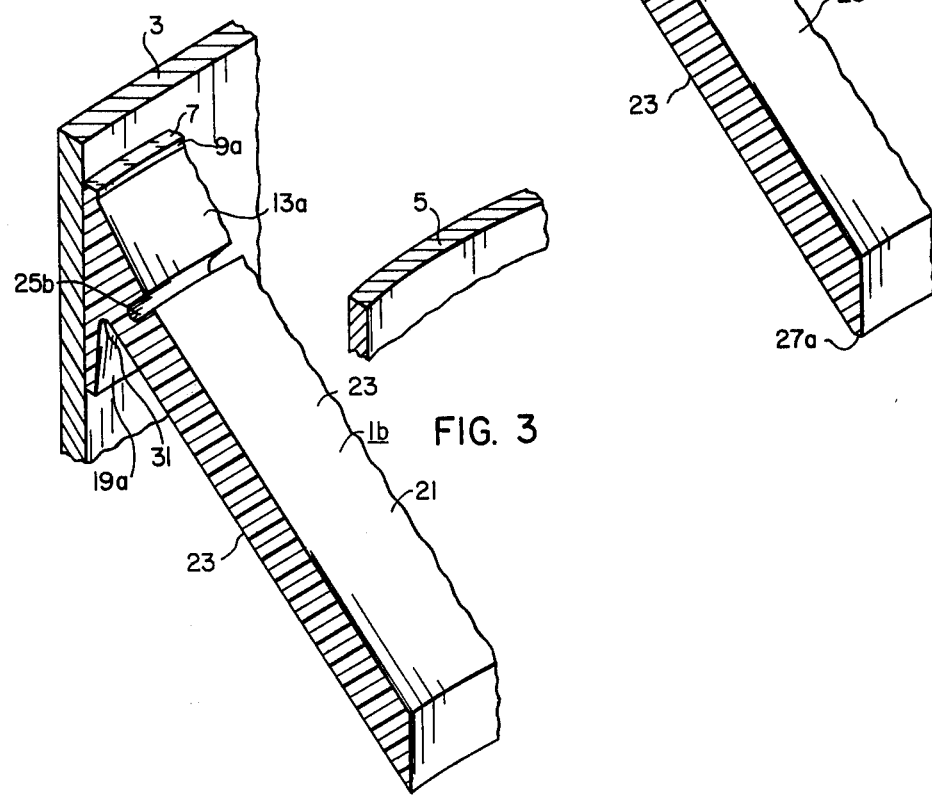

SEAL FOR LARGE ANNULAR OPENINGS

BACKGROUND OF THE INVENTION

This invention pertains to an annular seal and more particularly to an annular seal utilized to seal a large annular space.

Seals for sealing the annular space between a missile and a launch tube during a cold launch must form a tight seal and withstand the pressure during the launching process and exert low mechanical forces on the missile when it is being loaded in the launch tube. If the launch tube is mounted on a ship or other vehicle the seal must also withstand the lateral motion caused by shock or the pitch and roll of the vehicle without exerting large mechanical forces on the missile.

SUMMARY OF THE INVENTION

In general, an annular seal for sealing large annular spaces between a tubular member and a cylindrical member, when made in accordance with this invention, comprises an annular band forming a base, a low pressure side and a high pressure side. The base band is formed to generally engage the inner surface of the tubular member and to increase in thickness as it extends from its low pressure side toward its high pressure side. A frustoconical-shaped portion is made integral with the base and is so disposed that the apex would be on the high pressure side of the seal. The seal further comprises an annular groove disposed on the low pressure side between the base and the frustoconical-shaped portion, whereby the seal will deflect easily when inserting the cylinder member from the low pressure side and will withstand high differential pressure without blowing through.

BRIEF DESCRIPTION OF THE DRAWINGS

The objects and advantages of this invention will become more apparent from reading the following detail description in connection with the accompanying drawings, in which corresponding reference numerals indicate like parts and in which:

FIG. 2 is a partial perspective view of an alternate embodiment shown in section;

FIG. 3 is a partial perspective view of another embodiment shown in section;

DESCRIPTION OF THE PREFERRED EMBODIMENTS

Figure 1:
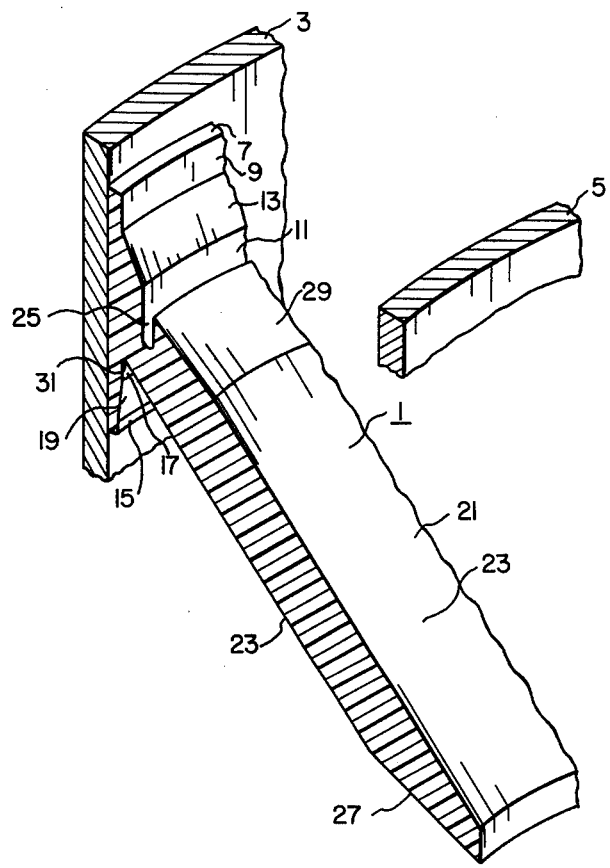
FIG. 1 is a partial perspective view of a seal made in accordance with this invention shown in section.

Referring now to the drawings in detail, and in particular to FIG. 1, there is shown a portion of an annular seal 1 for sealing a large annular space, generally in excess of 2 inches across, between a tubular member 3, such as a launch tube, and a cylindrical member 5, such as a missile.

The seal 1 comprises an annular band 7 forming a base, a low pressure side, the upper side, as shown in the drawings, and a high pressure side, the under side, as shown in the drawings. The base band 7 is generally formed to engage the inner surface of the launch tube 3 and is bonded thereto by an epoxy or other means. The base 7 has a first cylindrical portion 9 and a second cylindrical portion 11, which is thicker than the first cylindrical portion 9 and a conical-shaped portion 13 forming a transition or ramp between the first and second cylindrical portions 9 and 11, respectively. The first and second cylindrical portions 9 and 11 and the transition portion 13 form the low pressure end of the base 7. A third cylindrical portion 15 of different thicknesses and a frustoconical-shaped portion or ramp 19 forms the high pressure end of the base 7. The low pressure end of the base is substantially thicker than the high pressure end forming a hump or mound on the low pressure end.

Formed integral with the base 7 is a frustoconical funnel-shaped portion 21 extending inwardly from the circular base portion 7. The frustoconical portion 21 has generally parallel wall portions 23 which are so disposed that the apex of the cone would be on the axis of the missile 5 and on the high pressure side of the seal.

An annular groove 25 is disposed on the low pressure side of the seal between the base 7 and the frustoconical portion 21. The annular groove 25 is disposed generally parallel to the cylindrical portions of the base 7, is contiguous with the cylindrical portion 11 and generally has a depth about ½ the thickness of the frustoconical portion 21 in the embodiments shown. The inner end 27 of frustoconical portion 21 is shaved on the high pressure side so that the thickness of the frustoconical portion 21 decreases as it approaches the inner end thereof. A section 29 of the frustoconical portion 21 adjacent the groove 25 is shaved to a lesser extent than the inner end portion 27 so that the thickness of the frustoconical portion 21 is reduced slightly as it approaches the annular groove 25. The frustoconical portion 21 joins the high pressure end of the base 7 in such a manner as to form an annular fillet 31.

FIG. 2 shows a modified seal 1a which is similar to the seal 1 shown in FIG. 1 with the exception that the difference in thickness of the cylindrical portions 9a and 11a is much greater than the thickness of the cylindrical portion 9 and 11. Shaved portions 27a and 29a are very much shorter than the shaved portions 27 and 29 of the seal shown in FIG. 1, and finally, the high pressure end of the base forms a continuous taper so that the frustoconical surface 19a extends from the end of the base to the fillet 31.

FIG. 3 shows a seal 1b which is similar to the seal 1a with the exception that the groove 25b has been modified so that it is disposed at an angle with respect to the base rather than parallel to the cylindrical portions thereof.

Figure 4:
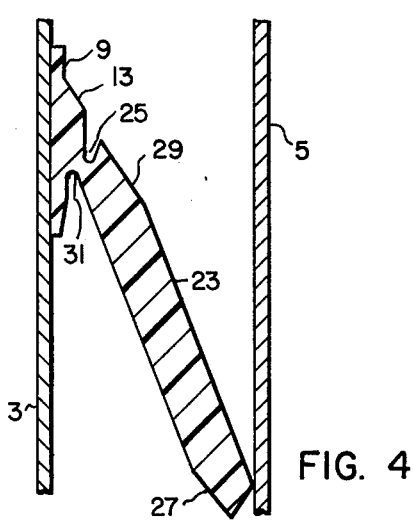
FIG. 4 is a sectional view showing the seal disposed in a launch tube and engaging a missile.

FIG. 4 shows the seal during the loading process or while in normal service, the notch 25 is open minimizing the force the inner edge of the seal 1 exerts on the cylindrical member or missile 5.

Figure 5:
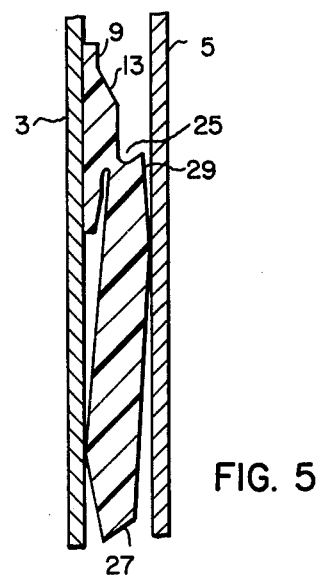
FIG. 5 is a sectional view showing a seal in a launch tube with the seal undergoing high lateral shock displacement from the missile.

FIG. 5 shows the seal 1 responding to a transverse shock displacement of the missile, the notch 25 is opened even more than in FIG. 4 and the frustoconical portion 21 is pressed between the missile and the launch tube.

Figure 6:
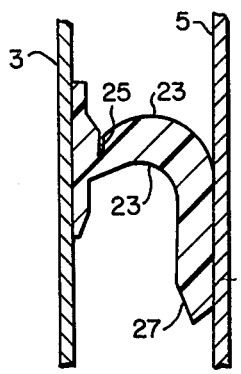
FIG. 6 is a sectional view showing the seal under launching pressure.

FIG. 6 shows the seal during the launching process. The high pressure on the underneath portion of the seal 1 has caused it to bulge upwardly closing the groove 25. The upper portion of the frustoconical portion 21 adjacent the groove 25 is in compression, thus the seal 1 acts substantially as if there were no groove 25 substantially increasing the stiffness of the seal and providing a section modulus sufficient to withstand the high pressures encountered during the launching process, and preventing blow through.

FIGS. 4, 5 and 6, when viewed together, show that the seal is relatively easily deflected during the loading of the missile or when reacting to transverse shock loads which may be experienced when the missile is disposed in the launch tube, and yet exhibits considerable stiffness when subjected to the high pressures encountered in the launching process as the groove 29 closes, causing the seal to react substantially as if there were no groove 25.

The surface of the seal which contacts the missile may be coated with Teflon or other low friction materials in order to reduce the drag on the missile in both the loading and launching processes.

What is claimed is:

1. An annular seal for sealing a large annular space between a tubular member and a cylindrical member, said annular seal comprising an annular band forming a base, a low pressure side and a high pressure side, said base band being formed to generally engage the inner surface of the tubular member and to increase in thickness as it extends from its low pressure side toward its high pressure side, a generally frustoconical-shaped portion made integral with the base and so disposed that the apex would be on the high pressure side of the seal and an annular groove disposed on the low pressure side of the seal between said base and said frustoconical-shaped portion, whereby said annular seal will deflect easily when inserting the cylindrical member from the low pressure side and will withstand high differential pressures without blowing through.

2. An annular seal as set forth in claim 1, wherein the frustoconical portion has generally parallel wall portions.

3. An annular seal as set forth in claim 1, wherein the depth of the groove is generally about one-half the thickness of the wall of the frustoconical portion.

4. An annular seal as set forth in claim 2, wherein the low pressure side of the frustoconical portion is shaved at an angle to reduce the wall thickness as it approaches the inner end of the frustoconical portion.

5. An annular seal as set forth in claim 1, wherein the base has a generally cylindrical outer peripheral surface and the groove is generally parallel to said peripheral surface.

6. The annular seal as set forth in claim 1, wherein the seal is formed from an elastomer.

7. A seal as set forth in claim 6, wherein the elastomer is a polyurethane.

* * * * *